United States Patent [19]
Philipp et al.

[11] Patent Number: 5,371,110
[45] Date of Patent: Dec. 6, 1994

[54] ION EXCHANGE POLYMERS AND METHOD FOR MAKING

[75] Inventors: Warren H. Philipp, Olmsted Township, Ohio; Kenneth W. Street, Jr., Westlake, both of Ohio

[73] Assignee: The United States of America as represented by the Administrator of the National Aeronautics and Space Administration, Washington, D.C.

[21] Appl. No.: 81,910

[22] Filed: Jun. 21, 1993

[51] Int. Cl.$^5$ .......................... B01J 39/18; C08F 8/28; C08J 5/22; C08L 23/26
[52] U.S. Cl. ........................................ 521/28; 521/25; 521/27; 521/31; 525/154; 525/330.2; 525/383
[58] Field of Search ............................. 521/28, 27, 31

[56] References Cited

U.S. PATENT DOCUMENTS

| | | |
|---|---|---|
| 2,783,212 | 2/1957 | Schnell . |
| 3,872,001 | 3/1975 | Davis et al. . |
| 4,221,872 | 9/1980 | Lydiate ................ 521/32 |
| 4,298,698 | 11/1981 | Kawase ................ 521/27 |
| 4,357,402 | 11/1982 | Sheibley et al. ..... 429/206 |
| 4,377,481 | 3/1983 | Jakabhazy . |

OTHER PUBLICATIONS

Philipp et al, Three Methods for In Situ Cross-Linking of Polyvinyl Alcohol Films for Application as Ion-Conducting Membranes in Potassium Hydroxide Electrolyte, Apr. 1979, pp. 3–4, NASA Technical Paper 1407.

Philipp et al, New Ion Exchange Membranes, Oct. 5–10, 1980, pp. 1 and 7; NASA Technical Memorandum 81670.

Philipp et al, Kinetics of Copper Ion Absorption by Cross-Linked Calcium Polyacrylate Membranes Feb. 1983, p. 2, NASA Technical Memorandum 83052.

Philipp et al, Ion Exchange Selectivity for Cross--Linked Polyacrylic Acid, Sep. 1983, NASA Technical Memorandum 83427.

*Primary Examiner*—Fred Zitomer
*Attorney, Agent, or Firm*—James A. Mackin; Gene E. Shook; Guy M. Miller

[57] ABSTRACT

An ion exchange polymer comprised of an alkali metal or alkaline earth metal salt of a poly(carboxylic acid) in a poly(vinyl acetal) matrix is described. The polymer is made by treating a mixture made of poly(vinyl alcohol) and poly(acrylic acid) with a suitable aldehyde and an acid catalyst to cause acetalization with some cross-linking. The material is then subjected to an alkaline aqueous solution of an alkali metal salt or an alkali earth metal salt. All of the film forming and cross-linking steps can be carried out simultaneously, if desired.

13 Claims, No Drawings

ION EXCHANGE POLYMERS AND METHOD FOR MAKING

ORIGIN OF THE INVENTION

This invention was made by employees of the United States Government and may be manufactured or used by or for the Government without the payment of any royalties thereto or therefor.

FIELD OF THE INVENTION

This invention relates to ion exchange resins for removing heavy metal ions from water or aqueous solutions and is directed more particularly to cation exchange polymers and a method for making such polymers.

BACKGROUND OF THE INVENTION

Before society became concerned with various kinds of environmental pollution, it was common for industries to dump production waste products into rivers, lakes, streams or special ponds. Some of these waste materials included highly toxic metal ions such as lead, cadmium, barium, mercury, and copper to name just a few.

One past method of cleaning water contaminated with heavy metal ions involved pumping the water into a holding tank and adding precipitating agents such as calcium hydroxide and flocculating chemicals such as alum. The resultant sludge was removed by settling or filtering and buried in a landfill.

Another method of decontaminating water involves pumping the water through a mass of ion exchange beads to a holding tank.

Both of the foregoing methods are expensive because they require pumping of massive amounts of water. Sludge burial is no longer acceptable because landfills are running out of space. Accordingly, there is a need for the capability of removing heavy metal ions from water or water containing mixtures without transferring water between sites.

It has been found that ion exchange membranes or films disposed in bodies of water polluted with heavy metals will attract heavy metal ions. The membranes or films can be cleansed of the heavy metal ions by various methods such as acid treatment. The ion exchange membranes must be insoluble in water.

Ion exchange membranes are known in the prior art and include particularly battery separators. In order to avoid the use of asbestos, state of the art battery separators use various polymers. Cross-linking of these polymers is accomplished by techniques such as heating or irradiation by electromagnetic waves such as ultraviolet radiation. Chemical methods of cross-linking are also used.

U.S. Pat. No. 3,872,001 teaches making an acid-containing porous polymer wherein a chelate-divalent metal complex has been reacted with the acid groups. Polluted water is directed through the porous polymer.

U.S. Pat. No. 4,357,402 discloses that a polyvinyl alcohol resin can be mixed, in aqueous solution, with a dialdehyde cross-linking agent and a water soluble acid aldehyde. The mixture is heated to dry and cross-link it.

U.S. Pat. No. 4,298,698 teaches that an alkali salt or an alkaline earth salt of an $\alpha$-alkyl acrylate can be dispersed in a hydrophilic polymer. The ingredients are subjected to ionizing radiation to effect cross-linking thereby forming an ion exchange membrane.

U.S. Pat. No. 4,377,481 discloses a polymeric membrane comprising a water-insoluble matrix polymer arid a water insoluble copolymer containing an acrylate or a methacrylate first monomer and a second monomer such as a carboxylic group which contributes hydrophilic properties to the blended membrane.

U.S. Pat. No. 2,783,212 discloses a cation exchange membrane comprising a polymerizable water soluble organic acid such as acrylic acid or methacrylic acid; a polymerizable organic compound containing at least two polymerizable double bonds in the presence of a polymerizable catalyst; and, a compound selected from the group consisting of polyhydric alcohols, polyamines or aldehydes.

SUMMARY OF THE INVENTION

The ion exchange polymer of the invention comprises a poly(carboxylic acid) supported in a water insoluble polymer matrix poly(vinyl acetal). The ion exchange polymer is made by mixing appropriate amounts of aqueous solutions of the poly(carboxylic acid) and poly(vinyl alcohol). The polymer mixture may be cast as a film or extruded as a fiber. After drying, the polymer is treated with a suitable aldehyde and acid catalyst in the presence of a salting out agent and water to cause acetalization of the poly(vinyl alcohol) thus locking in the poly(acrylic acid) so that the poly(carboxylic acid) can no longer be removed from the polymer by water.

When ion exchange polymer fibers are desired, the acetalization action may be initiated immediately prior to beginning the extrusion process. This simplifies production and reduces costs.

The cross-linked polymer is reacted with an alkaline earth metal hydroxide such as NaOH, $Ca(OH)_2$ or KOH. Certain hydroxides which contain toxic metals such as barium, although fulfilling the chemical reaction, would be unsuitable because the barium would be added to the polluted water from which heavy metal ions are being removed. $Ca(OH)_2$ is the preferred hydroxide as adding Ca cations to the water poses no threat to animals or vegetation.

DETAILED DESCRIPTION OF THE INVENTION

To make an ion exchange film, first an aqueous solution of poly(vinyl alcohol) (PVA) molecular weight (M.W.) about 25 to 250K and an aqueous solution of poly(acrylic acid) (PAA), M.W. about 100 to 500K are made up in separate containers. High molecular weight polymers are used because they give stronger films. The designated amounts of PAA and PVA solution are thoroughly mixed to give the desired volume of the specified PAA/PVA ratio in the polymer blend. The PAA/PVA ratio can be from 4:1 to 1:4. After thorough mixing the viscous solution is exposed to vacuum to remove trapped air bubbles. The solution may also be warmed to reduce viscosity during casting of the film. The film is cast on a smooth surface (glass plate) by spreading the polymer solution with a doctor blade or the polymer solution may be doctor bladed over a fiber glass mat to form a composite of greater strength. The cast solution on the glass plate is allowed to dry at room temperature and the film removed from the glass plate. At this stage, the film is soluble in water. It is now treated with the aldehyde solution to form the insoluble acetal via reaction of the poly(vinyl alcohol) with an acid solution of the aldehyde. A salting out agent is added to prevent the film from dissolving during treatment. The sheet of film is treated in one of the solutions of the following examples to convert the poly(vinyl alcohol) to the poly(vinyl acetal) then the film is activated by forming the calcium or sodium salt by standard reactions.

EXAMPLE 1

Although a wide variety of aldehydes may be used, one of the best modes in terms of film strength, availability and cost is formaldehyde. To one liter of water is dissolved 600 grams of calcium chloride dihydrate, the salting out agent, and 100 ml concentrated hydrochloric acid, the catalyst. When all is in solution, 500 ml of 37% formaldehyde solution in water is added with stirring. The films or composites are immersed in this solution and the solution heated to about 70° C. The films or composites are allowed to remain in the formaldehyde reagent at this temperature for about an hour. During this time the salting out agent prevents the film from dissolving while the formaldehyde reacts with the poly(vinyl alcohol) in the film to Form the water insoluble poly(vinyl formal); some cross-linking also takes place. The film, now insoluble in water is removed from the formaldehyde solution and washed thoroughly with deionized water. The ion exchange component is activated by converting it to calcium poly(acrylate). We have found that the calcium salt of poly(carboxylic acid) is the best mode in terms of practicality and efficiency for removing most divalent heavy metal cations (Pb, Cd, and Cu) from aqueous systems. The barium form is also efficient, but has the disadvantage of releasing toxic barium ion during ion exchange. The sodium or potassium form is not as effective as the alkali metal salts (Ca) for this purpose.

Conversion of the polyacid to the calcium form is accomplished by storing the films or composites in an aqueous suspension of $Ca(OH)_2$ or in an ammoniacal calcium salt solution. The sodium salt of the polyacid is formed by storing the films in dilute aqueous NaOH.

For use, the film or composite is removed from the calcium reagent, washed with deionized water then immersed in the aqueous system containing the toxic metal cations to be removed.

The formaldehyde treated films can also be stored in an aqueous solution of $Sr(OH)_2$ or $Ba(OH)_2$. The barium form of these films has the best mechanical strength; however, as a contaminant in water systems, barium is less desirable than calcium. The calcium from prepared in the above example has good mechanical properties. The films maintained their integrity even after exposure to boiling dilute $HNO_3$.

It has been shown in a previous investigation (reference 3) with granular radiation cross-linked poly(acrylic acid) that the sodium and potassium form has a greater driving force than the group II alkali salts of poly(acrylic acid) in ion exchange reactions with heavy metal cations. Our study shows that, for the poly(acrylic acid) - poly(vinyl formal) films made by the method just presented, the sodium form provides a more rapid initial ion exchange rate for copper ion removal; however, the calcium form is more efficient in that, in time, it reduces copper ion concentration to a lower limit.

EXAMPLE 2

The second example makes use of the dialdehyde, glutaraldehyde or 1,5 pentanedial. When dialdehydes are used, cross-linking is expected. Films comprising poly(acrylic acid)-poly(vinyl alcohol) are treated for about one hour at about 70° C. in the following solution.

Sodium sulfate, $Na_2SO_4$, 200 grams and 250 ml formic acid, HCOOH, are dissolved in one liter of deionized water. When all is in solution, 500 ml of 25% aqueous glutaraldehyde is added.

The calcium form of the 1:1 PAA/PVA treated film is somewhat brittle with a tendency to crack, however the sodium form is more flexible. In either case, they are not as strong as the formaldehyde treated films.

EXAMPLE 3

A third example involves cross-linking of the PVA in polymer blends by acetalization via selective oxidative cleavage of the 1,2-diol units using periodic acid, $HIO_4$. Although PVA is essentially a 1,3-diol polymer, the commercial product contains about 1 to 2 mole percent 1,2-diol units in its molecular structure. Certain oxidizing agents involving divalent reduction such as periodic acid and lead (IV) acetate oxidatively cleave these 1,2-diol units with the specific formation of aldehyde end groups. As discussed in previous examples, aldehydes in acid media undergo acetalization with the 1,3-diol units of the polymer thereby effecting cross-linking. This is accomplished by exposing the PAA/PVA film to the following solution at about 70° C. for at 1 east one hour.

To one liter of water is added 200 grams $Na_2SO_4$ and 50 ml concentrated $H_2SO_4$. When all is in solution, 30 grams of potassium periodate, $KIO_4$ is added and stirring is continued until all is in solution.

After removing the films from the periodate solution, they are washed with deionized water then stored in aqueous $Ca(OH)_2$. The extent of cross-linking depends on the relative number of 1,2-diol units in the PVA.

EXAMPLE 4

This example is similar to the first involving reaction with formaldehyde; however, in this case the formaldehyde is replaced by a higher member in the series namely, propionaldehyde or propanal. We provide this example because PAA/PVA polymer blend films exposed to the propanal reagent had excellent mechanical properties. The 1:1 PAA/PVA films were immersed in following solution for about an hour at about 70° C.

To one liter of deionized water is added 600 grams $CaCl_2.2H_2O$ and 100 ml concentrated HCl. When all is in solution, 500 ml 28% aqueous propionaldehyde is added with stirring.

The propanal treated films had good mechanical properties, even in the sodium form. Little swelling was observed when films were exposed to 0.1M aqueous NaOH overnight. This swelling was less than that observed for the formaldehyde acetalized films.

The concept of the invention is not limited to the examples given previously; forms other than films may be fabricated. Filaments, porous plugs, filters and fibers can be made from these polymer solutions by known state of the art techniques. Filaments were made on a laboratory scale by extruding the PAA/PVA polymer solution through a hypodermic needle onto a smooth glass surface. The thin filaments, after removal from the glass surface were treated with the formaldehyde reagent described in example 1 They were washed then stored in aqueous $Ca(OH)_2$.

For certain applications, the PAA/PVA ratio may be varied 1:1 to 1:5 weight ratio. In general, the higher the proportion of PVA greater the film strength at the expense of theoretical capacity for cation pick up. Although we find that high molecular weight polymers make stronger films, the use of lower molecular weight polymers, because they make for lower viscosity solutions allows the use of more concentrated polymer solutions for fabrication. Also the wet casting thickness is not limited to the 2 mm doctor blade setting; for certain uses, thinner films may be desirable. To increase mechanical strength or to provide greater surface area, films may be cast on substrates such as screens or cloth. These substrates may be coated with the ion exchange polymer blend. In general a 2 mm wet thickness using the polymer blend solution stated in previous examples gives a dry thickness of 0.25 to 0.30 mm. Thinner films are made be wet casting at 1.0 to 0.5 mm. In order to increase film surface area, films may be cast on a rough surface.

EXAMPLE 5

The fifth example illustrates yet another approach to the process. In this method, the aldehyde, acid catalyst and the PAA/PVA solution are combined into a single casting solution. In this case, acetalization and cross-linking take place internally for a one step operation; no second reaction step is necessary. Unfortunately, the pot life at room temperature for the PAA/PVA solution containing many aldehydes including glutaraldehyde and propanal with the hydrochloric acid catalyst is too short for any long time fabrication techniques-With many aldehydes, as soon as the HCl is added, the acetalization takes place almost immediately with the formation of water insoluble polymer. In contrast, a long room temperature pot life (at least several hours) was observed in such mixtures with formaldehyde as the acetalating aldehyde. Acetalization with the separation of a water insoluble polymer plug occurred a short time after the solution was heated to 70° C. Because of the relatively long pot life of the acidified formaldehyde solutions, these systems were used in a single step fabrication method for films, filaments rods and porous disks. The following specific example illustrates a representative formulation and its use in making a variety of shapes of the ion exchange polymer. For this one step method, the following solution was used:

A 10% aqueous solution of poly(acrylic acid), M.W. 450K, 75 ml and an equal volume of aqueous 10% PVA, M.W. 108K were mixed together. When the two solutions were completely blended, 20 grams of 37% aqueous formaldehyde was added and stirred into the polymer solution until completely mixed; finally, 5 grams of concentrated HCl diluted with about 10ml water was added and the whole stirred until homogeneous. The solution is now ready for use. Films may be made by casting the solution onto a smooth Teflon or glass surface. While the film is drying some reaction takes place and in time the reaction goes to completion. To insure complete acetalization, the films are heated to about 70° C. for about an hour. This same solution can also be used to make filaments by extrusion. Cylinders and rods can be made by flowing the solution into glass tubes of desired diameter then heating at about 70° C. for about an hour. The polymer liquid in the tubes on acetalization precipitates, with some narrowing, into cylinders or rods. These forms are readily removed from their molds, washed with deionized water, then converted to the calcium or even the sodium form for use.

Porous disks may be made by pouring this same polymer solution containing formaldehyde and HCl catalyst into a beaker then heating to about 70° C. for at least one hour. The cross-linked insoluble polymer forms a disk. The disk is washed with water then converted to the calcium salt by storing in ammoniacal calcium chloride.

The use of the single step system is not limited to the system described above. This specific composition used in the previous example is one of numerous variations and is presented only to identify a general one step procedure. The one step method is not restricted to articles, shapes or aldehyde composition given in the previous example. A possible extension of the single step process is to fabricate ion exchange composites such as the polymer supported on a fiber glass matrix.

In order to circumvent the short pot life of the one shot polymer solutions when aldehydes other than formaldehyde are involved, the method presented in the previous example had to be altered to accommodate other aldehyde formulations.

EXAMPLE 6

In this example, everything except the strong acid catalyst (HCl) is present in the processing solution; the acid is intentionally deleted. This technique has the advantage in that the extent of acetalization can be controlled by the amount of aldehyde added to the casting or processing solution. The finished article, e.g., a film, is rendered water insoluble by heating to about 60° C. for a specified time. In this case, the weak poly acid in ion exchange blend is sufficient to catalyze the acetalization reaction, at least at elevated temperatures. An alternative post treatment is to immerse the fabricated article, e.g., a film, in a dilute mineral acid solution such as 1 molar HCl. With most aldehydes the acetalization reaction takes place almost immediately on exposure to strong acid. A modification of this method was used in film making where the casting solution containing a specified amount of an aldehyde such propionaldehyde was doctor bladed on a smooth glass surface. A small volume of 1 molar HCl was sprayed from an atomizer on top of the film. When dry, the insoluble film was removed and converted to the calcium form.

The following specific example is presented to illustrate this general idea. 75 ml of 10% aqueous PAA M.W. 450K and 75 ml of 10% aqueous PVA M.W. 108K were blended together; then 7.5 grams of propionaldehyde (propanal) was added and the mixture stirred until the solution became homogeneous. This solution was doctor bladed onto a smooth glass surface. Before the cast film had dried, enough 1M HCl was atomized on to the film to completely cover the surface with the dilute acid. The dried film, now being insoluble in water, was removed from the glass plate, washed with deionized water to remove residual acid then stored in aqueous $Ca(OH)_2$ to form the calcium salt.

Although PAA as the active ion exchange polymer is the best of the poly acids in a practical sense, in terms of simplicity of molecular structure which affords the highest ion exchange capacity, other poly acids may also be used. For instance, poly(methacrylic acid) may also provide the active poly(carboxyl acid) polymer in blends with PVA and may offer certain advantages of product clarity and stability.

It is also evident that other aldehydes in addition to those presented in the examples could be used to insolubilized the polymer article via acetal formation. These aldehydes include acetaldehyde, butyraldehyde, 2- ethylbutanal, 2-methylpropanal, 3-methylbutanal, pentanal as well as water soluble dialdehydes.

The invention is not limited to go to the calcium or sodium salt of the poly acid in the article; any salt of the group 1 alkali metals (Na, K, Rb, Cs, or Li) and group II alkali earth metals (Ca, St, Ba and even Mg), or various combinations of these metals may be employed in the spirit of the invention. In certain cases where metal cations in solution resulting from ion exchange reactions would be detrimental, these articles may be activated by forming the salt of an organic base or even ammonia. These organic bases include guanidine, quaternary ammonium hydroxides such as tetramethyl ammonium hydroxide, tetra-ethyl ammonium hydroxide, as well as secondary and primary amines, difunctional amines (ethylene diamine) and polyamines (polyethyleneimine).

Referring now to Table I, there is shown the amount of Pb removed by a cation exchange film made with the following parameters.

A 10% aqueous solution of PVA having a molecular weight of 108,000 is mixed with a 10% aqueous solution of PAA having a molecular weight of 450,000. The mixture is cast as a film and dried. The films are placed in an aqueous solution containing formaldehyde, $CaCl_2$ and HCl and heated in a water both for about 45 minutes at 70° C. The films are then immersed in either $Ca(OH)_2$ or NaOH. Table I shows the difference in Pb removal where Ca as compared to Na is used.

TABLE I

|  | CALCIUM FORM | SODIUM FORM |
| --- | --- | --- |
| Initial Pb Concentration | 16.37 ppm | 16.37 ppm |
| Final Pb Concentration | <0.05 ppm | 1.44 ppm |
| pH | 5.63 | 5.93 |
| Amount of Film | 0.133 grams | 0.1286 grams |
| Amount of Solution | 200 ml | 200 ml |
| Exposure Time | 24 hours | 24 hours |

It will be understood that changes and modifications may be made to the above described invention without departing from its spirit and scope as set forth in the claims appended hereto.

What is claimed is:

1. An ion exchange material comprising a metal salt of a poly(carboxylic acid) wherein said metal is selected from the group consisting of Group I alkaline metals and Group II alkali earth metals in a poly(vinyl acetal) matrix, the ion exchange material being insoluble in water.

2. The material of claim 1 wherein the weight ratio of the poly(carboxylic acid salt) to the poly(vinyl acetal) is in a range of from about 3:1 to 1:4, respectively.

3. The material of claim 2 wherein the weight ratio of the poly(carboxylic acid salt) to the poly(vinyl acetal) is about 1:1.

4. The material of claim 1 wherein the metal of said alkali metal salt is selected from the group consisting of lithium, sodium and potassium.

5. The material of claim 1 wherein the metal of said alkali earth metal salt is selected from the group consisting of calcium, strontium and barium.

6. The material of claim 5 wherein the alkaline earth metal is calcium.

7. The material of claim 1 wherein the poly(carboxylic acid) is selected from the group consisting of poly(methacrylic acid) and poly(acrylic acid).

8. The material of claim 7 wherein the poly(carboxylic acid) is poly(acrylic acid).

9. The material of claim 1 wherein the poly(carboxylic acid) has a molecular weight of at least 100,000.

10. The material of claim 1 wherein the poly(carboxylic acid) has a molecular weight of from about 100,000 to about 500,000.

11. The material of claim 1 wherein the poly(vinyl acetal) has a molecular weight of from about 25,000 to about 250,000.

12. The material of claim 1 wherein the poly(vinyl acetal) is selected from the group consisting of poly(vinyl formal), poly(vinyl acetal), poly(vinyl 2-propanal) and poly(vinyl glutaral).

13. The material of claim 12 wherein the poly(vinyl acetal) is poly(vinyl formal).

* * * * *